(12) United States Patent
Egami

(10) Patent No.: US 8,413,416 B2
(45) Date of Patent: Apr. 9, 2013

(54) CABLE RETAINER

(75) Inventor: Hiroyuki Egami, Inagi (JP)

(73) Assignee: Fujitsu Frontech Limited, Inagi-shi, Tokyo (JP)

( * ) Notice: Subject to any disclaimer, the term of this patent is extended or adjusted under 35 U.S.C. 154(b) by 240 days.

(21) Appl. No.: 12/967,694

(22) Filed: Dec. 14, 2010

(65) Prior Publication Data
US 2011/0185697 A1    Aug. 4, 2011

(30) Foreign Application Priority Data

Jan. 29, 2010  (JP) .................................. 2010-018700

(51) Int. Cl.
*F16G 13/16*    (2006.01)
(52) U.S. Cl. ................ 59/78.1; 59/900; 248/49; 248/51
(58) Field of Classification Search ................... 59/78.1, 59/900; 248/49, 51
See application file for complete search history.

(56) References Cited

U.S. PATENT DOCUMENTS

| | | | | |
|---|---|---|---|---|
| 4,570,437 A | * | 2/1986 | Moritz | 59/78.1 |
| 4,807,432 A | * | 2/1989 | Mauri | 59/78.1 |
| 5,638,672 A | | 6/1997 | Furukawa | |
| 6,176,072 B1 | * | 1/2001 | Weber | 59/78.1 |
| 6,349,534 B1 | * | 2/2002 | Zanolla et al. | 59/78.1 |
| 7,249,452 B2 | * | 7/2007 | Komiya et al. | 59/78.1 |
| 7,520,122 B2 | * | 4/2009 | Kitagawa et al. | 59/78.1 |
| 7,526,910 B2 | * | 5/2009 | Komiya | 59/78.1 |
| 7,536,849 B2 | * | 5/2009 | Wehler et al. | 59/78.1 |

FOREIGN PATENT DOCUMENTS

| | | |
|---|---|---|
| JP | 2-063588 U | 5/1990 |
| JP | 6-048915 Y2 | 12/1994 |
| JP | 2589448 B2 | 3/1997 |
| JP | 2003-244831 A | 8/2003 |

* cited by examiner

*Primary Examiner* — David B Jones
(74) *Attorney, Agent, or Firm* — Westerman, Hattori, Daniels & Adrian, LLP

(57) ABSTRACT

A cable retainer which has a plurality of link members coupled to each other in a bendable manner for retaining a plurality of cables therein. When vertically moving a beam member along slits formed in opposite side plates of a cable retainer body, the beam member is positioned and fixed by causing engagement lugs of leg portions of the beam member to be engaged with serrated surfaces of side plates. Therefore, it is possible to adjust the fixing position of the beam member according to the wiring volume of cables to be retained, whereby it is possible to make the wiring capacity of link members variable.

4 Claims, 4 Drawing Sheets

CABLE RETAINER

CROSS-REFERENCE TO RELATED APPLICATION

This application is based upon and claims the benefit of priority of the prior Japanese Patent Application No. 2010-018700, filed on Jan. 29, 2010, the entire contents of which are incorporated herein by reference.

FIELD

The embodiment discussed herein is related to a cable retainer that has a plurality of link members, each of which is formed in an identical shape, coupled to each other, for retaining at least one cable therein in a bendable manner.

BACKGROUND

In apparatuses, such as industrial robots, which have movable parts that move relative to a machine main unit, cases often occur where it is necessary to install electric wiring between the machine main unit and the movable parts. In such cases, if electric cables connecting between the machine main unit and the movable parts are left in an exposed state, they are liable to be damaged e.g. by being brought into contact with external members, and hence there is a fear that cable disconnection or the like is caused. Further, also in a case where a main unit of a communication apparatus or an electronic apparatus and a movable unit thereof that can be pulled out of the main unit are electrically connected by cables, it is necessary to retain the cables so as to prevent the cables from being disconnected when the movable unit is moved in or out or to enable high-density packaging.

For this reason, to wire a plurality of cables, such as power wires and signal wires, to such a movable part that relatively moves, the cables are received and protected within e.g. a flexible cable retainer configured to have a chain-like shape. Such a chain-like cable retainer is formed such that it can change its shape according to relative movement of the machine main unit and the movable part, and hence it is possible to protect the electric cables from external members without causing adverse effects, such as interference with movement of the movable part.

As a conventional cable retainer, one disclosed in Japanese Patent No. 2589448 (Paragraphs [0016] and and FIG. 1) is known. Each of unitary link members constituting the cable retainer comprises a pair of side plate portions disposed in a manner spaced from each other by a predetermined distance in a horizontal direction, a bottom plate portion for connecting respective lower ends of the pair of side plate portions, and a beam member for partially closing upper portions of the side plate portions in a state in which cables, such as those of electric wires, are received between the pair of side plate portions so as to prevent the cables from coming out of the link member. The cable retainer is formed to be bendable, by fitting a cylindrical protrusion and a round hole formed at respective front and rear ends of ones of the link members to be coupled to each other. This prevents the cables from being damaged when routing them at the time of moving the movable unit into and out of the main unit, and also enable the cables to be smoothly moved thereafter. Therefore, it is possible not only to protect the whole cables but also to restrict uncontrolled movement of the cables themselves.

By the way, in such a conventional technique, the construction of a mold for forming each link member is simplified for reduction of the cost of the cable retainer. However, in the conventional cable retainers, each link member has a fixed space for passing a cable therethrough. Therefore, there are prepared many types of link members having respective different sizes or shapes in advance, and a wiring capacity is set according to wiring conditions of each cable retainer, whereby a link member having a size suitable for the wiring capacity is selected.

Assuming that the cable retainer is standardized without changing the structure of the conventional link member, in a case where the amount of cables is less than the space for passing the cables, a behavior of the cables becomes unstable due to a difference in wiring capacity, which may cause a problem such as cable disconnection.

Further, there is a case where the number of required cables may increase due to addition of a function to a device after being shipped. If cables the volume of which is more than the wiring capacity are inserted into the same cable retainer, the beam members which close the upper portions of the cable retainer may be damaged when the cable retainer is bent or may come off the side plate portions.

Therefore, due to a fixed volume of cables which can be accommodated in the link members of the conventional cable retainer, it is impossible to flexibly cope with an increase in the wiring capacity.

SUMMARY

According to an aspect of the invention, in a cable retainer that has a plurality of link members, each of which is formed in an identical shape, coupled to each other, for retaining at least one cable therein in a bendable manner, each link member includes a cable retainer body which includes a bottom plate having a predetermined width, and side plates which rise from respective lateral sides of the bottom plate to a predetermined height, and is capable of accommodating one cable or collectively a plurality of cables; and a beam member which is vertically movable along guide rails formed on the respective side plates, and is fixed to the cable retainer body at a location spaced from the bottom plate by a desired distance, when inserting the at least one cable from an open side of the side plates into the cable retainer body and retaining the at least one cable therein, wherein the cable retainer body is configured such that a fitting hole and a protrusion are formed at respective front and rear portions of the cable retainer body such that the cable retainer body can be coupled to another cable retainer body disposed adjacent thereto in a front-rear direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
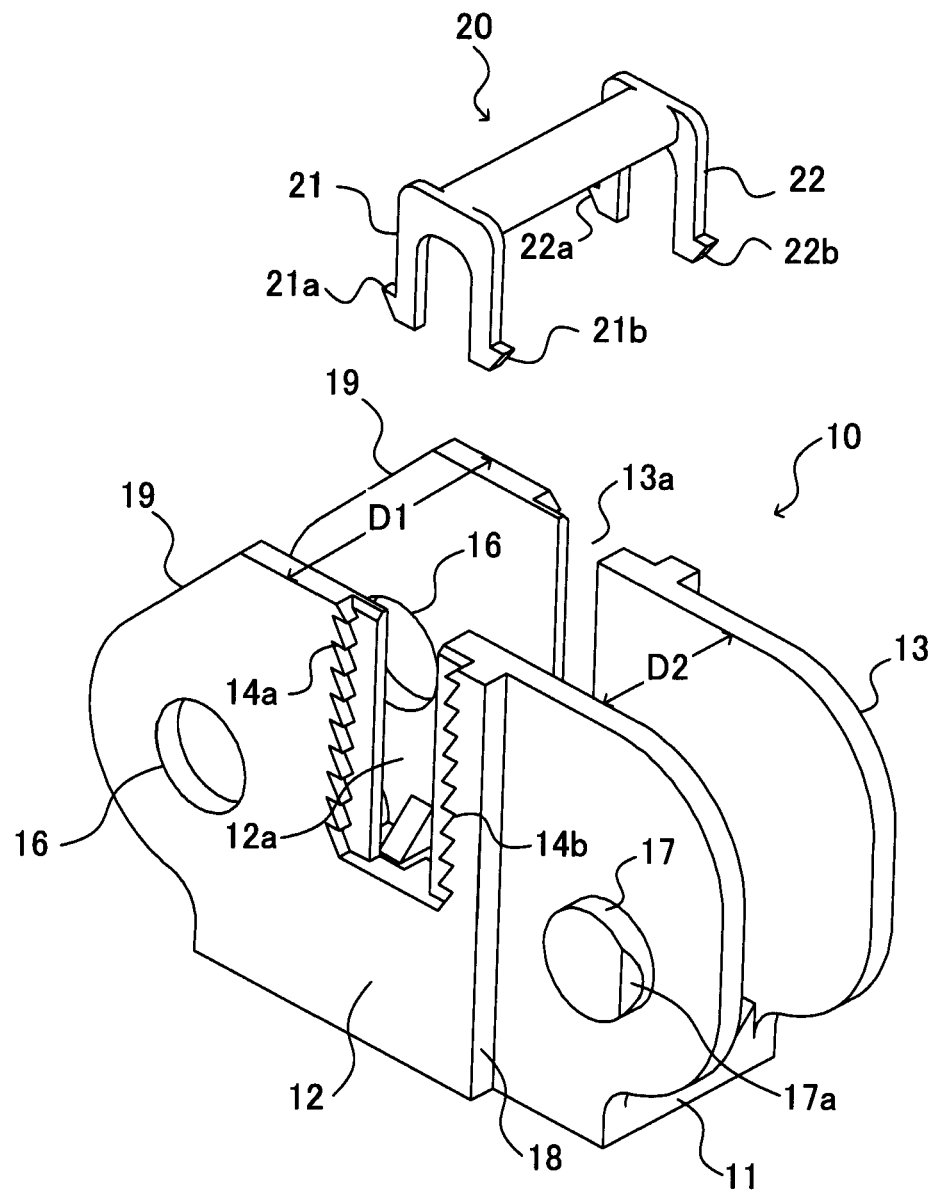
FIG. 1 is a perspective view of a cable retainer body and a beam member according to an embodiment of the present invention.

An embodiment of the present invention will be explained below with reference to the accompanying drawings, wherein like reference numerals refer to like elements throughout. FIG. 1 is a perspective view of a cable retainer body and a beam member according to the embodiment of the present invention.

FIG. 1 illustrates a single link member formed by the cable retainer body 10 and the beam member 20 as component elements thereof. The cable retainer body 10 includes a bottom plate 11 having a predetermined width D1, and lateral side plates 12 and 13 which vertically rise from the bottom plate 11 to a predetermined height. The cable retainer body 10 is formed of an elastic material and has an inner space, U-shaped in cross-section, which is defined between the side plates 12 and 13 with a space width D2 such that at least one cable (not illustrated) can be inserted. That is, although depending on the diameter of a cable, when one or a plurality thereof are inserted into the cable retainer body 10 from an open side of the side plates 12 and 13, the link member can collectively retain the cable(s).

The lateral side plates 12 and 13 are formed with slits 12a and 13a that extend vertically from respective upper ends thereof to a predetermined depth. Further, outer surfaces of the side plates 12 and 13 are formed with serrated surfaces 14a and 14b on opposite sides of each of the slits 12a and 13a in a manner opposed to each other (only illustrated in the side plate 12 in FIG. 1). The serrated surfaces 14a and 14b each form a serrated latching surface by protrusions each formed by an upwardly-facing inclined surface and a horizontal latching surface. Guide rails of the beam member 20 are formed by the slits 12a and 13a and the serrated surfaces 14a and 14b.

The beam member 20 has a thickness which allows insertion thereof into the slits 12a and 13a of the lateral side plates 12 and 13, and a stick-like shape which is slightly longer than the space width D2 of the cable retainer body 10, with bifurcated leg portions 21 and 22 formed of an elastic material at respective laterally opposite ends thereof. The leg portions 21 and 22 have retaining engagement lugs 21a and 21b and 22a and 22b formed on free ends thereof, respectively, for engagement with the guide rails. The engagement lugs 21a and 21b and 22a and 22b are engaged with the serrated surfaces 14a and 14b of the side plates 12 and 13.

Further, the cable retainer body 10 has fitting holes 16 formed in respective front portions of the outer surfaces of the lateral side plates 12 and 13, and protrusions 17, each having a size corresponding to that of each fitting hole 16, formed on respective rear portions of the side plates 12 and 13 arranged to provide an outer width which is slightly narrower than the width D1. To change the outer width provided by the lateral side plates 12 and 13 as they extend in the front-rear direction, they are provided with linear step portions 18. Further, a rear portion of each protrusion 17 is formed to have an inclined surface 17a. By fitting the protrusions 17 of one cable retainer body 10 into the fitting holes 16 of another cable retainer body 10 adjacent thereto, the adjacent two cable retainer bodies 10 are coupled to each other.

Figure 2:
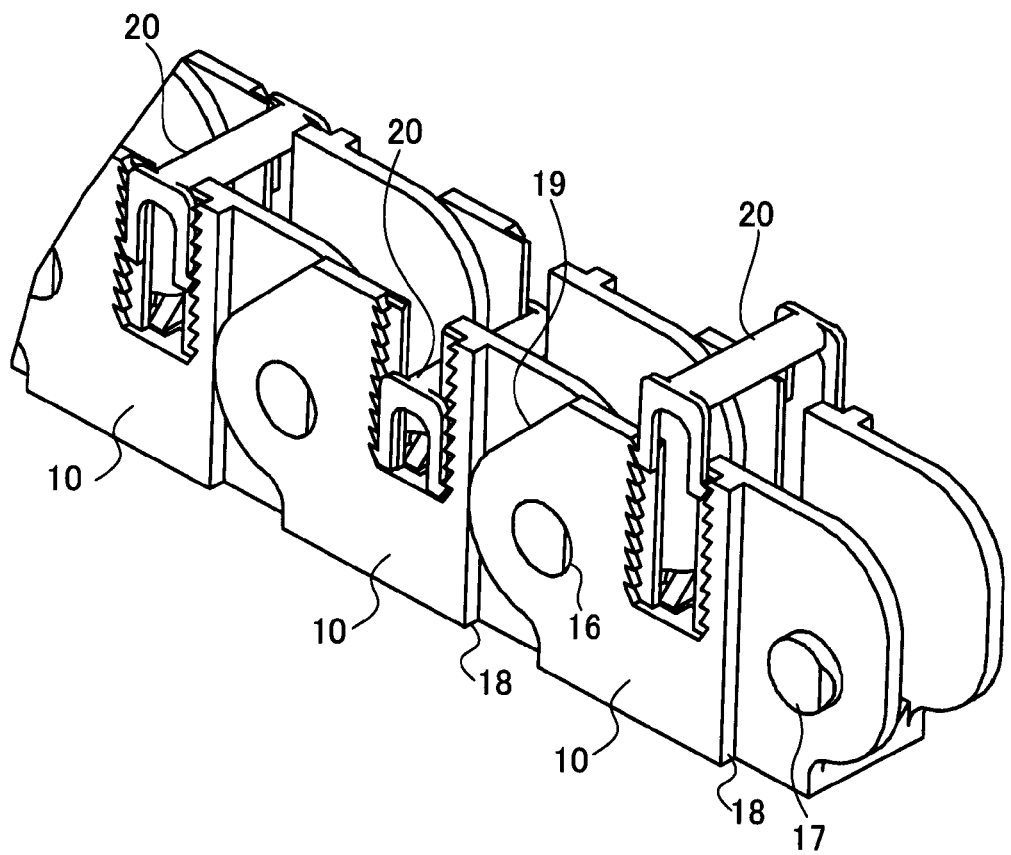
FIG. 2 is a perspective view illustrating a state in which a plurality of cable retainer bodies are coupled to each other.
Figure 3:
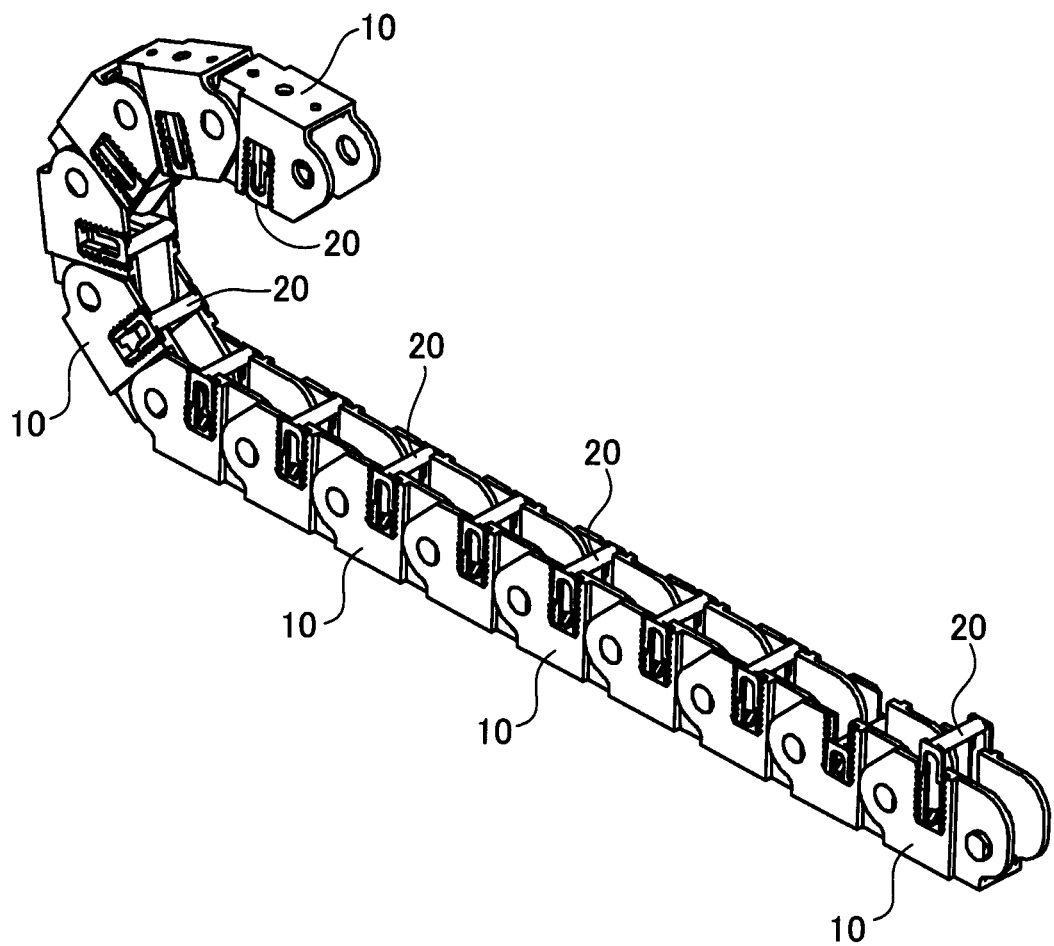
FIG. 3 is a perspective view illustrating the entire arrangement of a cable retainer which retains cables in a bendable manner.
Figure 4:
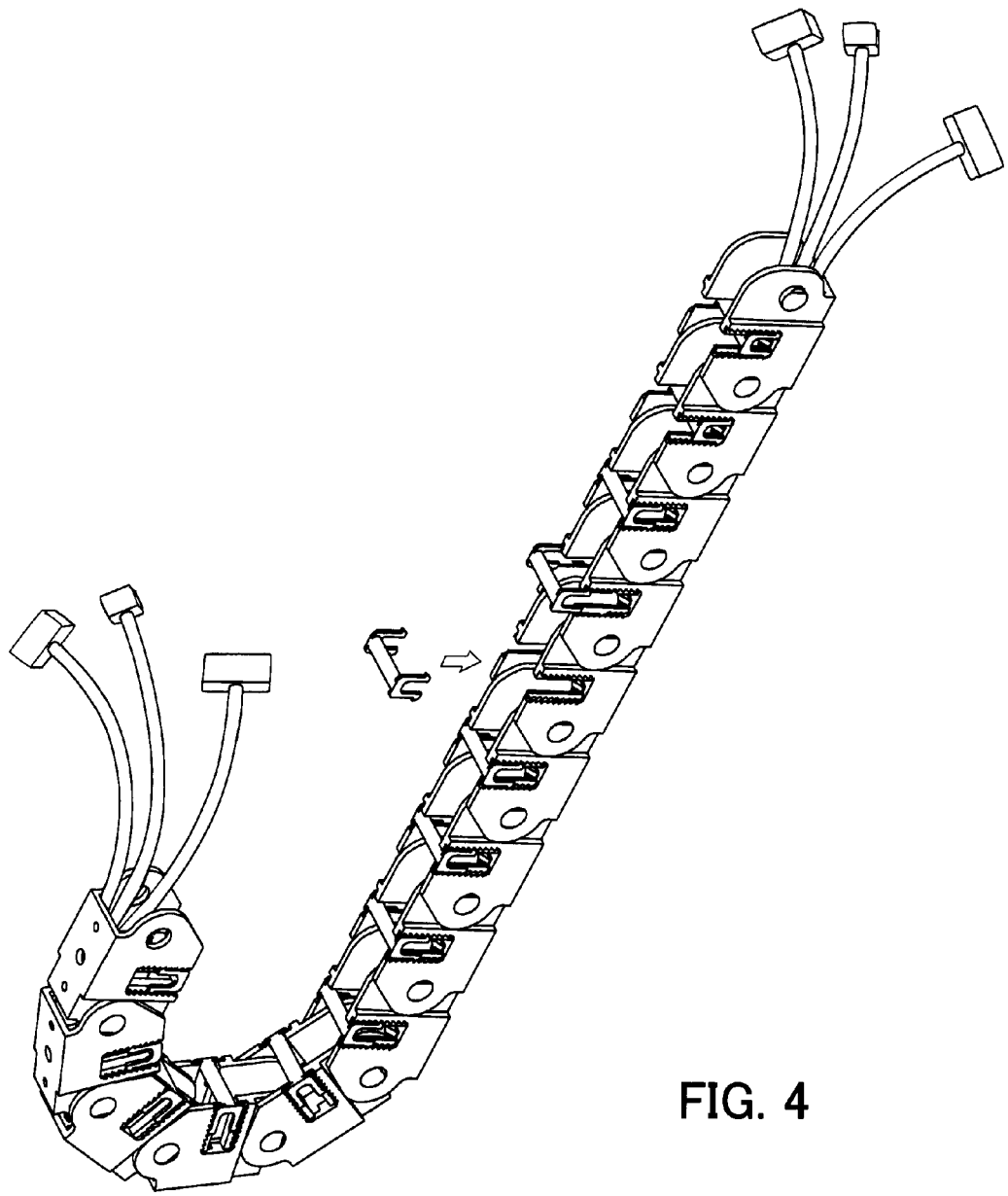
FIG. 4 is a perspective view illustrating a state in which the plurality of cable retainer bodies are coupled to each other and cables are mounted therein.

FIG. 2 is a perspective view illustrating a state in which a plurality of cable retainer bodies are coupled to each other, FIG. 3 is a perspective view illustrating the entire arrangement of a cable retainer which retains cables in a bendable manner, and FIG. 4 is a perspective view illustrating a state in which the plurality of cable retainer bodies are coupled to each other, and cables are mounted therein.

Referring to FIGS. 3 and 4, even when a force acts to bend the cable retainer formed in a chain shape, the link members are not bent beyond a predetermined angle. This is because slopes 19 formed on respective front ends of the lateral side plates 12 and 13 are brought into abutment with the step portions 18 thereof to thereby restrict the pivotal angle of each cable retainer body 10. Further, when the cable retainer is in a straightened state, a front end of the bottom plate 11 of one link member and a rear end of the bottom plate 11 of an adjacent link member are brought into abutment with each other, which prevents the cable retainer from being bent in a reverse direction. Since the bending angle is restricted as above, the curvature radius of bending is not unnecessarily reduced, and therefore, it is possible to prevent the cables from being disconnected or likewise damaged due to repeated bending of the retained cables by a small curvature radius.

Thus, the plurality of cable retainer bodies 10 are coupled to each other, whereby it is possible to form a flexible chain-like cable retainer for retaining cables. When one or a plurality of cables are held in the cable retainer in a bendable manner, only by pushing the beam member 20 along the guide rails into the cable retainer body 10, the beam member 20 is fixed to a desired position with respect to the cable retainer body 10. Therefore, it is possible to easily change the fixing position of the beam member 20 according to the volume of the cable(s) to be held in the cable retainer body 10.

Since it is possible to adjust the position of the beam member 20 according to the volume of the cable(s), it is possible to standardize the size of a unitary link member (the cable retainer body 10 and the beam member 20) as a component of the cable retainer, which makes it possible to reduce the costs. Further, only one cable retainer can cope with even a region conventionally requiring a plurality of cable retainers, which makes it possible to obtain the effect of saving space in a communication device or an electronic device.

Further, in the present embodiment, even when the volume of cables to be inserted and held by the cable retainer is small, it is possible to reduce the free space inside each link member, which prevents the cables from coming out of the link member, so that it is possible to positively prevent cable disconnection and like problems.

It should be noted that although in the present embodiment, as a means for fixing the beam member 20 to a desired position of the cable retainer body 10, the leg portions 21 and 22 of the beam member 20 are configured such that they are engaged with the guide rails provided on the respective outer surfaces of the side plates 12 and 13, in a manner bridging over the side plates 12 and 13, this is not limitative. Certainly, to change the position of the beam member 20 upward later for the purpose of adding a cable, it is convenient to have the guide rails on the respective outer surfaces of the side plates 12 and 13, with a view to performing operations to deform the engagement lugs 21a, 21b, 22a, and 22b provided on the leg portions 21 and 22 of the beam member 20 in a direction toward each other using a jig to thereby release the engagement lugs 21a, 21b, 22a, and 22b from the state engaged with the serrated surfaces 14a and 14b. However, in a case where the cable retainer is applied to where there is no possibility of increasing the space for accommodating cables, the guide rails may be provided on respective inner surfaces of the side plates 12 and 13.

The cable retainer of the present invention has an advantageous effect that a space within the cable retainer defined by the link member can be changed by adjusting the fixing position of the beam member, whereby it is possible to freely obtain a space for retaining cables according to the wiring volume of cables without changing the size of the link member itself.

That is, the cable retainer is configured to be capable of changing its wiring capacity without adding new components, and hence it has flexibility in the wiring capacity, and can easily cope with changes in the scale of wiring of cables required for a communication device or an electronic device. As a result, it is possible to not only maintain and improve the quality of wiring of cables, but also reduce the costs of components by standardizing the cable retainer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A cable retainer that has a plurality of link members, each of which is formed in an identical shape, coupled to each other by a fitting hole and a protrusion formed at respective front and rear portions of the link members, for retaining at least one cable therein in a bendable manner,
   wherein each link member comprises:
   a cable retainer body which includes a bottom plate having a predetermined width, and side plates which rise from respective lateral sides of the bottom plate to a predetermined height, and is capable of accommodating one cable or collectively a plurality of cables; and
   a beam member which is vertically movable along guide rails formed on the respective side plates, and is fixed to the cable retainer body at a location spaced from the bottom plate by a desired distance, when inserting the at least one cable from an open side of the side plates into the cable retainer body and retaining the at least one cable therein,
   wherein the guide rails have serrated latching surfaces formed on the respective side plates,
   wherein the beam member is formed with leg portions on laterally opposite ends thereof, the leg portions having retaining engagement lugs at respective ends thereof for engagement with the latching surfaces, and
   wherein the beam member is pushed in along the guide rails, and is fixed to a desired position with respect to the cable retainer body to thereby retain the at least one cable in the cable retainer body.

2. The cable retainer according to claim 1, wherein the guide rails have slits formed in the respective side plates, each slit having a predetermined depth from an upper end of each side plate and a width allowing insertion of the beam member, and
   wherein the latching surfaces are formed on respective outer surfaces of the side plates along the respective slits.

3. The cable retainer according to claim 2, wherein the beam member is provided with the leg portions which are each formed of an elastic material in a bifurcated shape on the laterally opposite ends thereof, and the engagement lugs are formed on respective free ends of the leg portions, in a manner protruding outward, and
   wherein the latching surfaces are formed on the respective outer surfaces of the side plates at respective locations for engagement with the engagement lugs which protrude from the respective leg portions opposed to each other of the beam member inserted into the slits.

4. The cable retainer according to claim 1, wherein the cable retainer body is formed of an elastic material, and an inner space thereof for retaining the at least one cable has a U-shaped cross-section.

* * * * *